(12) United States Patent
Morishita

(10) Patent No.: US 6,874,955 B2
(45) Date of Patent: Apr. 5, 2005

(54) FIXING DEVICE FOR FIXING AN AUTOFOCUS MODULE TO A MIRROR BOX OF AN SLR CAMERA

(75) Inventor: Shigeru Morishita, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/699,886

(22) Filed: Nov. 4, 2003

(65) Prior Publication Data

US 2004/0096206 A1 May 20, 2004

(30) Foreign Application Priority Data

Nov. 5, 2002 (JP) ........................................ 2002-320795

(51) Int. Cl.[7] .............................................. G03B 17/02
(52) U.S. Cl. ...................... 396/354; 396/358; 396/535
(58) Field of Search ................................ 396/354–359, 396/447, 535

(56) References Cited

U.S. PATENT DOCUMENTS 4,427,277 A * 1/1984 Haraguchi .................. 396/355
5,033,844 A * 7/1991 Itabashi ..................... 396/354
5,369,456 A   11/1994 Yokota
5,390,051 A    2/1995 Saito et al.
5,479,230 A * 12/1995 Uematsu .................... 396/358
5,592,337 A    1/1997 Hama
5,646,711 A    7/1997 Kitazawa et al.
5,778,270 A    7/1998 Morisawa
6,630,959 B1  10/2003 Shono

* cited by examiner

Primary Examiner—David M. Gray
(74) Attorney, Agent, or Firm—Greenblum & Bernstein, P.L.C.

(57) ABSTRACT

A fixing device for fixing an autofocus module to a mirror box of an SLR camera having a quick-return mirror accommodated in the mirror box, wherein the quick-return mirror has a half mirror portion so that a light bundle of an object which is passed through the half mirror portion is reflected by a sub-mirror to be incident on the autofocus module. The fixing device includes an adjustment bracket which is provided separately from the mirror box, the adjustment bracket is fixed to an underside of the mirror box, and the auto focus module is fixed to the adjustment bracket.

8 Claims, 3 Drawing Sheets

FIXING DEVICE FOR FIXING AN AUTOFOCUS MODULE TO A MIRROR BOX OF AN SLR CAMERA

BACKGROUND OF THE INVENTION

1. Field of the Invention

The present invention relates to a fixing device for fixing an autofocus module to a mirror box of an SLR camera in which a quick-return mirror is accommodated.

2. Description of the Related Art

In typical SLR cameras having an autofocus system, a part of the quick-return mirror (main mirror) is formed as a half mirror portion while a sub-mirror is held by the quick-return mirror to be positioned behind the half mirror portion so that a light bundle of an object which is passed through the half mirror portion (hereinafter referred to as "object light bundle for autofocusing") is reflected downwards by the sub-mirror to be incident on an AF (autofocus) module which includes a CCD line sensor and other optical elements. Conventionally, the angle of the sub-mirror with respect to the quick-return mirror is determined so that the object light bundle for autofocus is reflected downwards by the sub-mirror in a direction substantially orthogonal to the photographing optical axis (the optical axis of a photographing lens mounted to the camera body) when the quick-return mirror is in its initial position (position before a shutter release), and the AF module is fixed to an underside of the mirror box, in which the quick-return mirror is accommodated, so that the vertical position of the AF module can be adjusted with respect to the underside of the mirror box. Namely, the direction in which the position of the AF module can be adjusted is the same as the traveling direction of the object light bundle for autofocusing which has been reflected downwards by the sub-mirror toward the AF module, and such an object light bundle can be made to be incident precisely on the AF module by an adjustment of the position of the AF module.

In recent years there has been a tendency to increase the length of the sub-mirror to broaden an AF area (distance measuring area) in the vertical direction. To this end, the object light bundle for autofocusing is reflected downwards by the sub-mirror not in a direction orthogonal to the photographing optical axis but in a direction slightly oblique and forward of a direction orthogonal to the photographing optical axis to prevent the sub-mirror from interfering with the focal plane shutter, which is positioned behind the quick-return mirror.

In this case where the object light bundle for autofocusing is reflected downwards by the sub-mirror in a direction slightly oblique and forward of a direction orthogonal to the photographing optical axis (i.e., to the underside of the mirror box to which the AF module is fixed), the traveling direction of the object light bundle for autofocusing which has been reflected downwards by the sub-mirror to be incident on the AF module is not coincident with the direction in which the position of the AF module can be adjusted. This is of little importance as long as the deviation of the traveling direction of the object light bundle for autofocusing relative to the direction in which the position of the AF module can be adjusted is small. However, if the deviation is great, it is difficult to adjust the position of the AF module so that the object light bundle for autofocusing is properly incident on the AF module.

SUMMARY OF THE INVENTION

The present invention provides a fixing device for fixing an AF module to a mirror box of an SLR camera in which the object light bundle for autofocusing is reflected downwards by the sub-mirror in a direction non-orthogonal to an underside of the mirror box, wherein the direction in which the AF module, which is supported by the mirror box, is adjustable can be made coincident with the object light bundle for autofocusing which travels from the sub-mirror to the AF module.

The present invention has been devised in view of the idea that the AF module, which was formerly fixed directly to an underside of the mirror box, is fixed indirectly thereto via an adjustment bracket provided separately from the mirror box.

According to an aspect of the present invention, a fixing device is provided, for fixing an autofocus module to a mirror box of an SLR camera having a quick-return mirror accommodated in the mirror box, wherein the quick-return mirror has a half mirror portion so that a light bundle of an object which is passed through the half mirror portion is reflected by a sub-mirror to be incident on the autofocus module. The fixing device includes an adjustment bracket which is provided separately from the mirror box. The adjustment bracket is fixed to an underside of the mirror box. The autofocus module is fixed to the adjustment bracket.

It is desirable for the adjustment bracket to include a plurality of guide bosses having a plurality of female screw holes, respectively. Axes of the plurality of female screw holes are parallel to a traveling direction of the light bundle which is reflected by the sub-mirror after passing through the half mirror portion in a state where the adjustment bracket is fixed to the underside of the mirror box. The autofocus module includes a plurality of screw support portions for supporting a plurality of adjusting/fixing screws which are screwed into the plurality of female screw holes, respectively, an AF module optical system of the autofocus module being supported by a casing of the AF module so that an incident optical axis of the AF module optical system extends parallel to axes of the plurality of adjusting/fixing screws. A plurality of compression springs are positioned between the plurality of screw support portions and the plurality of the guide bosses, respectively.

It is desirable for a traveling direction of the light bundle which is reflected by the sub-mirror after passing through the half mirror portion to be non-orthogonal to a photographing optical axis of a photographing lens.

It is desirable for the plurality of guide bosses to project downwards in a direction oblique and forward of a direction orthogonal to the underside of the mirror box.

The AF module optical system can include a condenser lens, an optical axis of which is defined as the incident optical axis of the AF module optical system.

It is desirable for an opening to be formed on a bottom wall of the mirror box, and the adjustment bracket to be fixed to an underside of the bottom wall around the opening.

The plurality of compression springs can be a plurality of compression coil springs which are loosely fitted on the plurality of adjusting/fixing screws, respectively.

The AF module optical system can further include a reflecting mirror and a second condenser lens. The light bundle, which is reflected by the sub-mirror after passing through the half mirror portion, firstly passes through the condenser lens, and is subsequently reflected by the reflecting mirror to be incident on the second condenser lens. The incident optical axis is angled at an angle less than 90 degrees with respect to an optical axis of the second condenser lens.

The present disclosure relates to subject matter contained in Japanese Patent Application No.2002-320795 (filed on Nov. 5, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
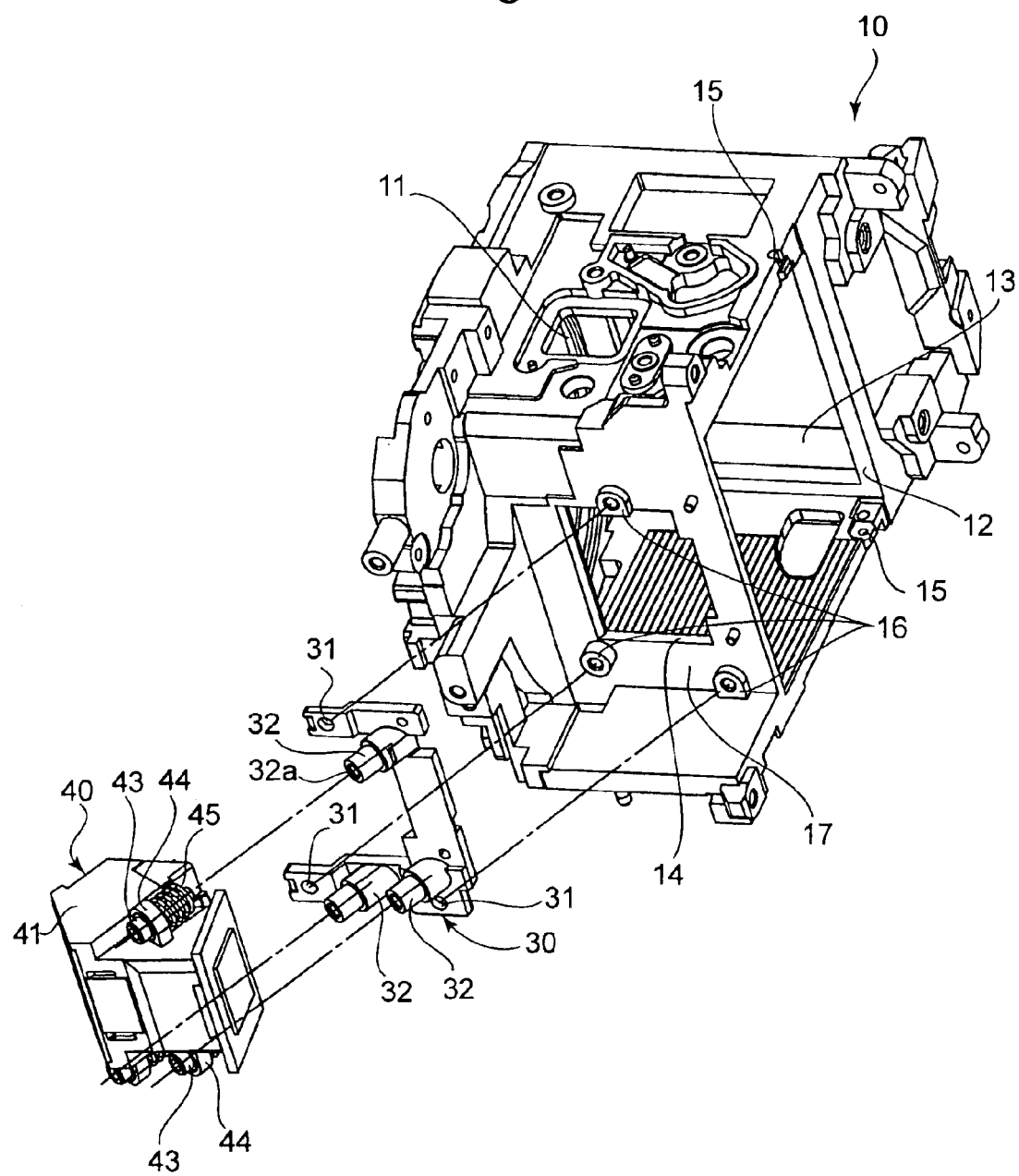
FIG. 1 is an exploded perspective view of an embodiment of a fixing device for fixing an AF module to a mirror box of an SLR camera, according to the present invention.
Figure 2:
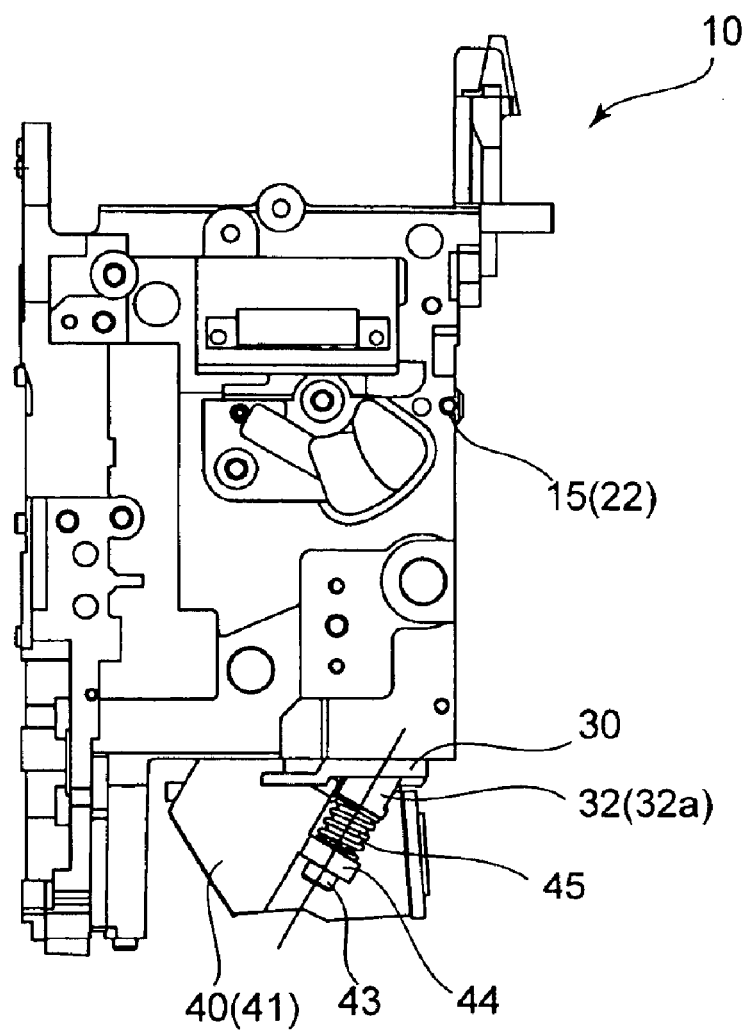
FIG. 2 is a side elevational view of the fixing device shown in FIG. 1 in an assembled state.

As shown in FIGS. 1 and 2, a mirror box 10 of an SLR camera is in the shape of a substantially rectangular prism. The mirror box 10 is provided on the front thereof with a lens mount (circular aperture) 11 to which an interchangeable photographing lens (not shown) is detachably attached. The mirror box 10 is provided on the rear end thereof with a rectangular photographing aperture 12 for a focal plane shutter (not shown). The mirror box 10 is provided on top thereof with a rectangular aperture 13 for a viewfinder optical system (not shown). The mirror box 10 is provided on the side walls thereof with a pair of bearing holes 15 in which opposite ends of a horizontal pin (pivot) 22 of a quick-return mirror 20 (see FIG. 3) are fitted, respectively. The mirror box 10 is provided with a bottom wall 17 which has a bottom opening 14 for an AF (autofocus) module 40. The mirror box 10 is provided, on an underside thereof around the bottom opening 14, with three fixing holes 16 for fixing an adjustment bracket 30 to the underside of the mirror box 10.

As is known in the art, the quick-return mirror 20 is angled at approximately 45 degrees with respect to a photographing optical axis X so that object light which is passed through the photographing lens is reflected upwards by the quick-return mirror 20 to proceed toward a viewfinder optical system (not shown) when the quick-return mirror 20 is in the viewing position. Immediately after a release button (not shown) is fully depressed, the quick-return mirror 20 is flipped up to the photographing position (retracted position) about the pair of bearing holes 15 to retreat from a photographing path behind the photographing lens so that the object light which is passed thorough the photographing lens is incident on a film surface through the focal plane shutter. A part of the quick-return mirror 20 is formed as a half mirror portion 20b (see FIG. 3).

Figure 3:
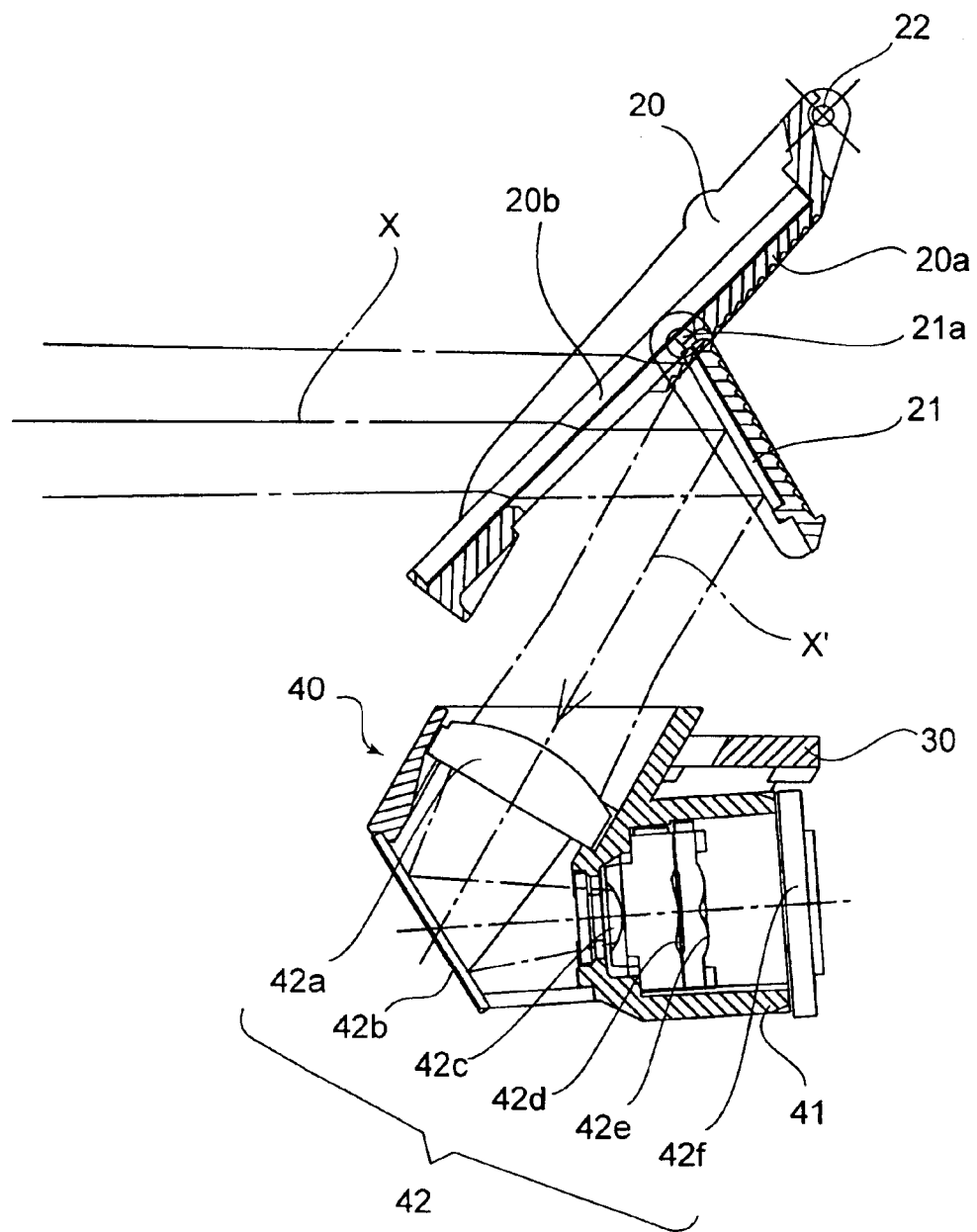
FIG. 3 is an optical diagram of a quick-return mirror, a sub-mirror and the AF module, showing an optical path thereof.

On the other hand, a sub-mirror 21 is pivoted on a pivot 21a fixed to the back of the quick-return mirror 20. The sub-mirror 21 reflects a light bundle (object light bundle for autofocusing) incident thereon which is passed through the half mirror portion 20b downwards when the quick-return mirror 20 is in the viewing position. When the quick-return mirror 20 is in the photographing position, the sub-mirror 21 lies on the back of the half mirror portion 20b to prevent light which comes from the viewfinder optical system from entering the mirror box 10 through the half mirror portion 20b. The structures of the quick-return mirror 20 and the sub-mirror 21 are well-known in the art. The angle of the sub-mirror 21 in a viewing state shown in FIG. 3 is determined so that a traveling direction X' of the object light bundle for autofocusing reflected by the sub-mirror 21 is non-orthogonal to the photographing optical axis X and slightly oblique and forward of a direction orthogonal to the photographing optical axis X to prevent the sub-mirror 21 from interfering with the focal plane shutter, which is positioned behind the quick-return mirror 20.

In the illustrated embodiment shown in FIGS. 1 and 2, the AF module 40 is not fixed directly to the underside of the mirror box 10 but indirectly to the underside of the mirror box 10 via the adjustment bracket 30. As clearly shown in FIG. 1, the adjustment bracket 30 has a substantially U shape to be positioned around the bottom opening 14, and is provided with three screw holes 31 which are formed to correspond to the three fixing holes 16 of the mirror box 10, respectively. The adjustment bracket 30 is provided on a lower surface thereof with three guide bosses 32 which project parallel to each other in a direction oblique and forward of a direction orthogonal to the underside of the mirror box 10. The three guide bosses 32 are provided with three female screw holes 32a, respectively. The axes of the three female screw holes 32a extend parallel to the aforementioned traveling direction X' of the object light bundle for autofocusing reflected by the sub-mirror 21 in a state where the adjustment bracket 30 is fixed to the underside of the mirror box 10 by three set screws (not shown), which are screwed into the three fixing holes 16, respectively.

The AF module 40 is provided therein with an AF module optical system 42 for detecting focus information (defocus information) by receiving the object light bundle for autofocusing reflected by the sub-mirror 21. As shown in FIG. 3, the AF module optical system 42 includes a first condenser lens 42a, a reflecting mirror 42b, a second condenser lens 42c, a mask 42d, a separator lens 42e and a line sensor 42f. The optical axis of the first condenser lens 42a is defined as an incident optical axis of the AF module optical system 42. The AF module optical system 42 is a conventional optical system for obtaining focus information (defocus information) of an object by receiving the object light bundle for autofocusing reflected by the sub-mirror 21 in phase-difference detecting method. In accordance with the focus information, a focusing lens group of the photographing lens mounted on the lens mount 11 is driven to bring the object into focus.

A casing 41 of the AF module 40 is provided with three screw support portions 44 having through holes so that three adjusting/fixing screws 43 are firstly inserted through the three through holes of the three screw support portions 44 and subsequently screwed into the three female screw holes 32a of the three guide bosses 32, respectively. The axes of the three adjusting/fixing screws 43 supported by the three screw support portions 44 are parallel to the incident optical axis of the AF module optical system 42. Three compression coil springs 45 are loosely fitted on the three adjusting/fixing screws 43 to be positioned between the three screw support portions 44 and the three guide bosses 32.

In the present embodiment of the fixing device for fixing the AF module 40 to the mirror box 10, firstly the adjustment bracket 30 is fixed to the underside of the mirror box 10 by three set screws (not shown) with the three screw holes 31 being aligned with the three fixing holes 16. In this state where the adjustment bracket 30 is properly fixed to the underside of the mirror box 10, the axes of the three female screw holes 32a of the three guide bosses 32 are parallel to the traveling direction X' of the object light bundle for autofocusing reflected by the sub-mirror 21. Subsequently, the three adjusting/fixing screws 43 which are inserted through the three screw support portions 44 to be supported thereby are screwed into the three female screw holes 32a of the three guide bosses 32, respectively. At this time, since each screw support portion 44 is biased in a direction away from the associated guide boss 32 by the spring force of the associated compression coil spring 45, the position of each screw support portion 44 with respect to the associated guide boss 32 is maintained if the associated adjusting/fixing screw 43 stops being screwed into the female screw hole 32a of the associated guide boss 32. Since the axial direction of each adjusting/fixing screw 43 is parallel to the incident optical axis of the AF module optical system 42, the orientation of the AF module 40 does not substantially change if all of the three adjusting/fixing screws 43 are turned to change the position thereof with respect to the female screw hole 32a of the associated guide boss 32. Accordingly, the position of the AF module 40 in the traveling direction X' can be adjusted by changing the positions of screw-engagement of the female screw hole 32a with respect to the three adjusting/fixing screws 43 at the same time, while a direction of the incident optical axis of the AF module optical system 42 can be made precisely coincident with the traveling direction X' of the object light bundle for autofocusing reflected by the sub-mirror 21 by finely adjusting the position of one of the adjusting/fixing screws 43 with respect to corresponding one of the associated female screw hole 32a.

A conventional mirror box which is provided on the underside thereof with a plurality of fixing holes in which set screws are screwed to fix an AF module directly to the bottom wall 17 of the mirror box can be used as the mirror box 10 as it is since such a plurality of fixing holes of the conventional mirror box can be used to serve as the three fixing holes 16 of the mirror box 10. Namely, the present embodiment of the fixing device for fixing the AF module 40 to the mirror box 10 can be achieved with the addition of only the adjustment bracket 30, with exception that the AF module 40 is newly designed. This does not incur a substantial increase in the cost of production.

Although the above described structure wherein the optical axis of the first condenser lens 42a is bent rearwards by the reflecting mirror 42b in the AF module optical system 42 of the AF module 40 is advantageous to reduce the size of the AF module 40, the AF module optical system of the AF module can be designed with no reflecting mirror corresponding to the reflecting mirror 42b depending upon the shape of a camera body and other factors.

As can be understood from the foregoing, according to the present invention, a fixing device for fixing an AF module to a mirror box of an SLR camera is achieved in which the object light bundle for autofocusing is reflected downwards by the sub-mirror in a direction non-orthogonal to the underside of the mirror box, wherein the direction in which the AF module, which is supported by the mirror box, is adjustable can be brought into coincident with the object light bundle for autofocusing which travels from the sub-mirror to the AF module in an SLR camera.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A fixing device for fixing an autofocus module to a mirror box of an SLR camera having a quick-return mirror accommodated in said mirror box, wherein said quick-return mirror has a half mirror portion so that a light bundle of an object which is passed through said half mirror portion is reflected by a sub-mirror to be incident on said autofocus module, wherein said fixing device comprises an adjustment bracket which is provided separately from said mirror box, wherein said adjustment bracket is fixed to an underside of said mirror box, and wherein said autofocus module is fixed to said adjustment bracket.

2. The fixing device according to claim 1, wherein said adjustment bracket comprises a plurality of guide bosses having a plurality of female screw holes, respectively, wherein axes of said plurality of female screw holes are parallel to a traveling direction of said light bundle which is reflected by said sub-mirror after passing through said half mirror portion in a state where said adjustment bracket is fixed to said underside of said mirror box, wherein said autofocus module includes a plurality of screw support portions for supporting a plurality of adjusting/fixing screws which are screwed into said plurality of female screw holes, respectively, an AF module optical system of said autofocus module being supported by a casing of said AF module so that an incident optical axis of said AF module optical system extends parallel to axes of said plurality of adjusting/fixing screws, and wherein a plurality of compression springs are positioned between said plurality of screw support portions and said plurality of said guide bosses, respectively.

3. The fixing device according to claim 1, wherein a traveling direction of said light bundle which is reflected by said sub-mirror after passing through said half mirror portion is non-orthogonal to a photographing optical axis of a photographing lens.

4. The fixing device according to claim 2, wherein said plurality of guide bosses project downwards in a direction oblique and forward of a direction orthogonal to said underside of said mirror box.

5. The fixing device according to claim 1, wherein said AF module optical system comprises a condenser lens, an optical axis of which is defined as said incident optical axis of said AF module optical system.

6. The fixing device according to claim 1, wherein an opening is formed on a bottom wall of said mirror box, and wherein said adjustment bracket is fixed to an underside of said bottom wall around said opening.

7. The fixing device according to claim 2, wherein said plurality of compression springs comprise a plurality of compression coil springs which are loosely fitted on said plurality of adjusting/fixing screws, respectively.

8. The fixing device according to claim 5, wherein said AF module optical system further comprises a reflecting mirror and a second condenser lens, wherein said light bundle, which is reflected by said sub-mirror after passing through said half mirror portion, firstly passes through said condenser lens, and is subsequently reflected by said reflecting mirror to be incident on said second condenser lens, and wherein said incident optical axis is angled at an angle less than 90 degrees with respect to an optical axis of said second condenser lens.

* * * * *